US007930523B2

(12) United States Patent
Nakasato

(10) Patent No.: US 7,930,523 B2
(45) Date of Patent: Apr. 19, 2011

(54) INTER-CPU DATA TRANSFER DEVICE

(75) Inventor: Hiroki Nakasato, Nagoya (JP)

(73) Assignee: Denso Corporation, Kariya (JP)

( * ) Notice: Subject to any disclaimer, the term of this patent is extended or adjusted under 35 U.S.C. 154(b) by 1196 days.

(21) Appl. No.: 11/594,853

(22) Filed: Nov. 9, 2006

(65) Prior Publication Data

US 2007/0109308 A1 May 17, 2007

(30) Foreign Application Priority Data

Nov. 11, 2005 (JP) ................................ 2005-327517

(51) Int. Cl.
*G06F 9/52* (2006.01)
*G06F 9/54* (2006.01)

(52) U.S. Cl. ....................................... 712/225; 712/228

(58) Field of Classification Search .................. 712/225, 712/228
See application file for complete search history.

(56) References Cited

U.S. PATENT DOCUMENTS

| | | | | |
|---|---|---|---|---|
| 4,402,046 | A | 8/1983 | Cox et al. | |
| 4,967,398 | A * | 10/1990 | Jamoua et al. | 365/230.05 |
| 5,590,279 | A * | 12/1996 | Kawabata et al. | 714/53 |
| 6,249,843 | B1 * | 6/2001 | Arimilli et al. | 711/120 |
| 2003/0120877 | A1 * | 6/2003 | Jahnke | 711/150 |
| 2004/0107419 | A1 | 6/2004 | Blackmore et al. | |

FOREIGN PATENT DOCUMENTS

| | | |
|---|---|---|
| EP | 0 369 265 A2 | 5/1990 |
| EP | 0 369 265 A3 | 5/1990 |
| EP | 1 191 447 A1 | 3/2002 |
| JP | 61-091758 | 5/1986 |
| JP | 62-108345 | 5/1987 |
| JP | 01-106191 | 4/1989 |
| JP | 3-129548 | 6/1991 |
| JP | 05-008664 | 1/1993 |
| JP | 07-319839 | 12/1995 |
| JP | 2001-242929 | 9/2001 |

OTHER PUBLICATIONS

Extended European Search Report dated Jan. 30, 2008 with the Examiner's Opinion in Patent Application No. EP 06 023 570.2.

Japanese Office Action dated Dec. 2, 2008 issued in corresponding Japanese Application No. 2005-327517 with English Translation.

* cited by examiner

*Primary Examiner* — Daniel Pan
(74) *Attorney, Agent, or Firm* — Nixon & Vanderhye P.C.

(57) ABSTRACT

The inter-CPU data transfer device is used for an electronic control apparatus which includes a first CPU having a first memory and a second CPU having a second memory, the first CPU periodically performing a data-updating process to update a plurality data items stored in the first memory, the second CPU performing a data-referring process in which the plurality of the data items updated by the first CPU are referred to for computation purpose. The inter-CPU data transfer device further includes a data transfer memory, a first data transfer section activated in order to write the plurality of the data items written in the first memory to the data transfer memory when the first CPU starts the data updating process, and a second data transfer section writing the plurality of the data items written in the data transfer memory to the second memory when the second data transfer section detects that the second CPU is not performing the data-referring process.

6 Claims, 7 Drawing Sheets

WATER TEMPERATURE SENSOR
INTAKE AIR TEMPERATURE SENSOR
ENGINE CONTROL ECU
A/D CONVERTER
ALU
RAM
ROM
INTERRUPTION HANDLING SECTION
CPU1
FIFO BUFFER
FIFO CONTROLLER
ALU
RAM
ROM
INTERRUPTION HANDLING SECTION
CPU2
TIMER
TIMER
TIMER
TIMER
INJECTOR #1
INJECTOR #2
INJECTOR #3
INJECTOR #4
1
2
3
5
7
11
13
15
17
21
23
25
27
29
31
33
35
37
41
43
45
47
51
53

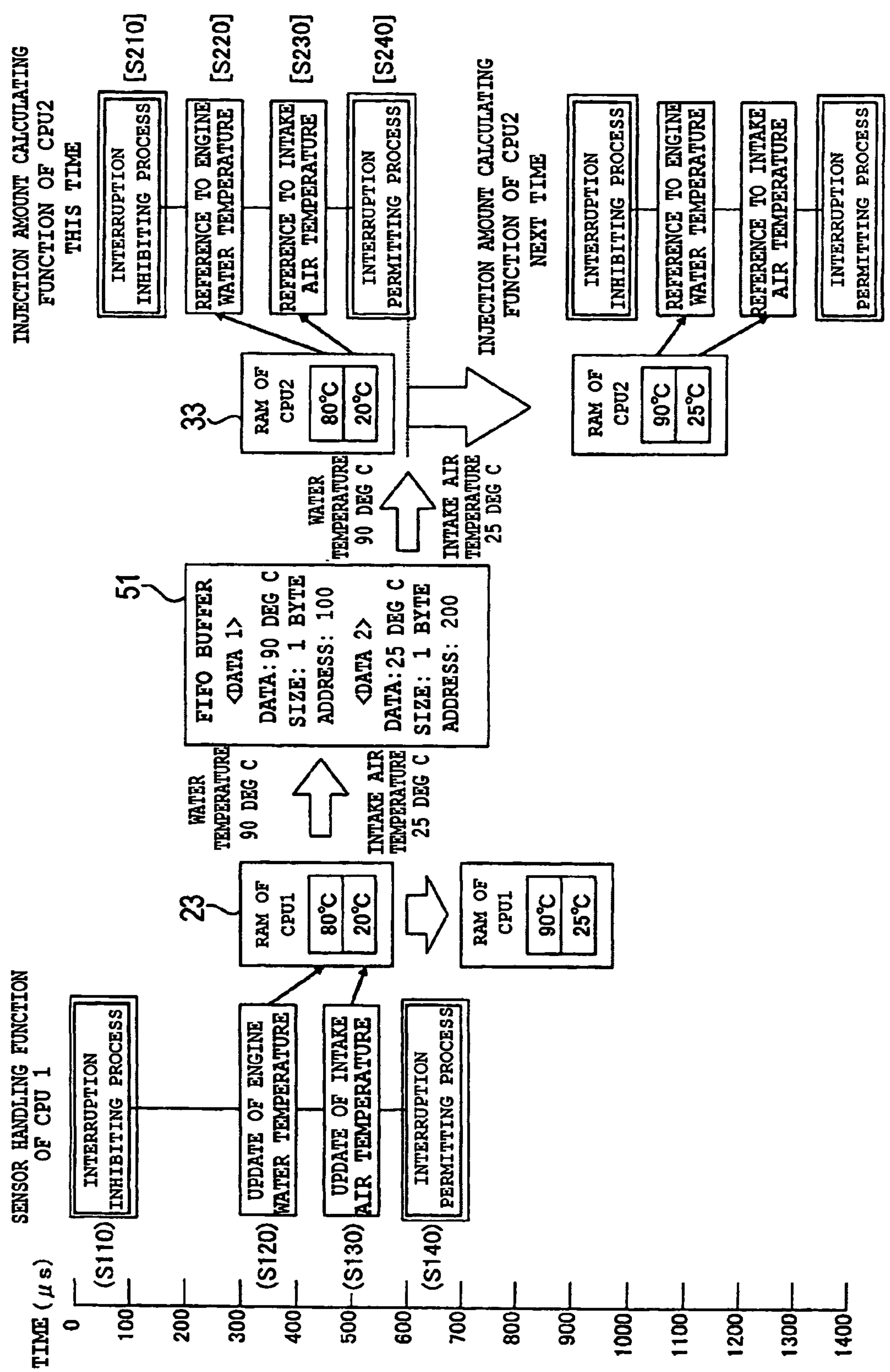

FIG. 2
TIME (μs)
0
100
200
300
400
500
600
700
800
900
1000
1100
1200
1300
1400
(S110)
(S120)
(S130)
(S140)
SENSOR HANDLING FUNCTION OF CPU 1
INTERRUPTION INHIBITING PROCESS
UPDATE OF ENGINE WATER TEMPERATURE
UPDATE OF INTAKE AIR TEMPERATURE
INTERRUPTION PERMITTING PROCESS
23
RAM OF CPU1
80°C
20°C
RAM OF CPU1
90°C
25°C
WATER TEMPERATURE 90 DEG C
INTAKE AIR TEMPERATURE 25 DEG C
51
FIFO BUFFER
<DATA 1>
DATA: 90 DEG C
SIZE: 1 BYTE
ADDRESS: 100
<DATA 2>
DATA: 25 DEG C
SIZE: 1 BYTE
ADDRESS: 200
WATER TEMPERATURE 90 DEG C
INTAKE AIR TEMPERATURE 25 DEG C
33
RAM OF CPU2
80°C
20°C
INJECTION AMOUNT CALCULATING FUNCTION OF CPU2 THIS TIME
[S210]
INTERRUPTION INHIBITING PROCESS
[S220]
REFERENCE TO ENGINE WATER TEMPERATURE
[S230]
REFERENCE TO INTAKE AIR TEMPERATURE
[S240]
INTERRUPTION PERMITTING PROCESS
RAM OF CPU2
90°C
25°C
INJECTION AMOUNT CALCULATING FUNCTION OF CPU2 NEXT TIME
INTERRUPTION INHIBITING PROCESS
REFERENCE TO ENGINE WATER TEMPERATURE
REFERENCE TO INTAKE AIR TEMPERATURE
INTERRUPTION PERMITTING PROCESS

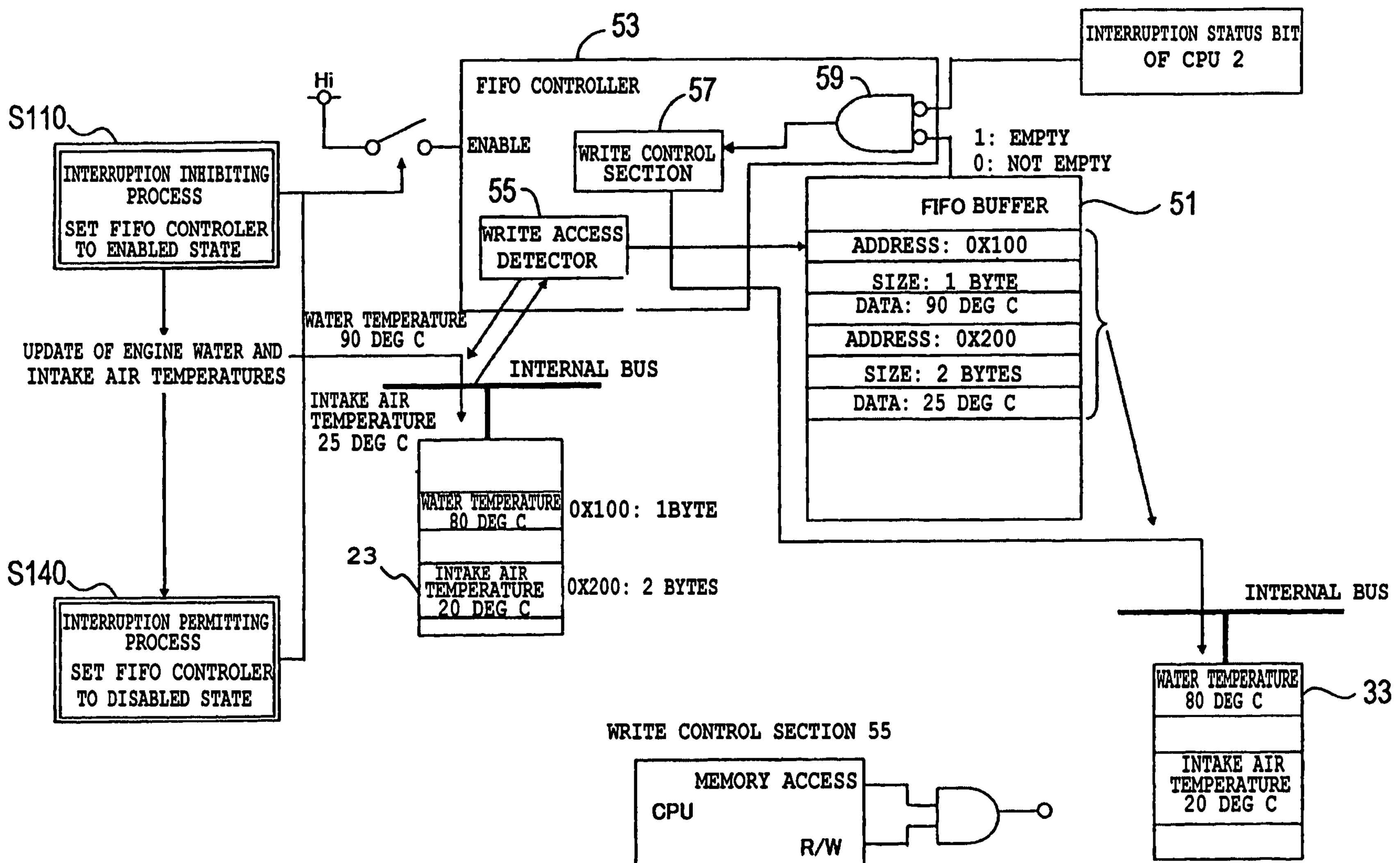
FIG. 3
S110
INTERRUPTION INHIBITING PROCESS
SET FIFO CONTROLER TO ENABLED STATE
UPDATE OF ENGINE WATER AND INTAKE AIR TEMPERATURES
S140
INTERRUPTION PERMITTING PROCESS
SET FIFO CONTROLER TO DISABLED STATE
Hi
53
FIFO CONTROLLER
ENABLE
57
WRITE CONTROL SECTION
55
WRITE ACCESS DETECTOR
59
INTERRUPTION STATUS BIT OF CPU 2
1: EMPTY
0: NOT EMPTY
FIFO BUFFER
51
ADDRESS: 0X100
SIZE: 1 BYTE
DATA: 90 DEG C
ADDRESS: 0X200
SIZE: 2 BYTES
DATA: 25 DEG C
WATER TEMPERATURE 90 DEG C
INTAKE AIR TEMPERATURE 25 DEG C
INTERNAL BUS
WATER TEMPERATURE 80 DEG C
0X100: 1BYTE
23
INTAKE AIR TEMPERATURE 20 DEG C
0X200: 2 BYTES
INTERNAL BUS
WATER TEMPERATURE 80 DEG C
33
INTAKE AIR TEMPERATURE 20 DEG C
WRITE CONTROL SECTION 55
MEMORY ACCESS
CPU
R/W

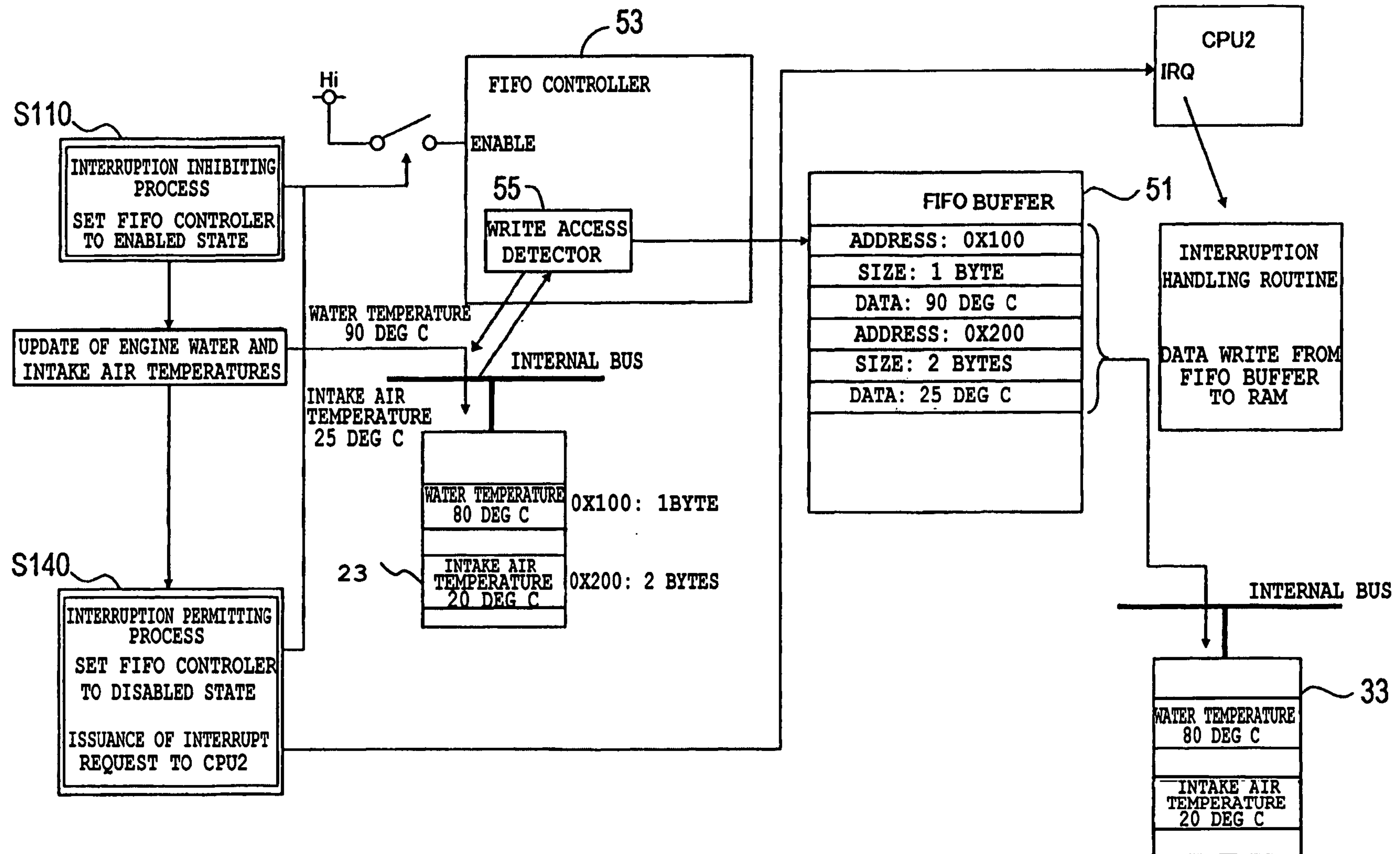

FIG. 4
S110
INTERRUPTION INHIBITING PROCESS
SET FIFO CONTROLER TO ENABLED STATE
UPDATE OF ENGINE WATER AND INTAKE AIR TEMPERATURES
S140
INTERRUPTION PERMITTING PROCESS
SET FIFO CONTROLER TO DISABLED STATE
ISSUANCE OF INTERRUPT REQUEST TO CPU2
Hi
53
FIFO CONTROLLER
ENABLE
55
WRITE ACCESS DETECTOR
WATER TEMPERATURE 90 DEG C
INTERNAL BUS
INTAKE AIR TEMPERATURE 25 DEG C
WATER TEMPERATURE 80 DEG C
0X100: 1BYTE
23
INTAKE AIR TEMPERATURE 20 DEG C
0X200: 2 BYTES
FIFO BUFFER
51
ADDRESS: 0X100
SIZE: 1 BYTE
DATA: 90 DEG C
ADDRESS: 0X200
SIZE: 2 BYTES
DATA: 25 DEG C
CPU2
IRQ
INTERRUPTION HANDLING ROUTINE
DATA WRITE FROM FIFO BUFFER TO RAM
INTERNAL BUS
33
WATER TEMPERATURE 80 DEG C
INTAKE AIR TEMPERATURE 20 DEG C

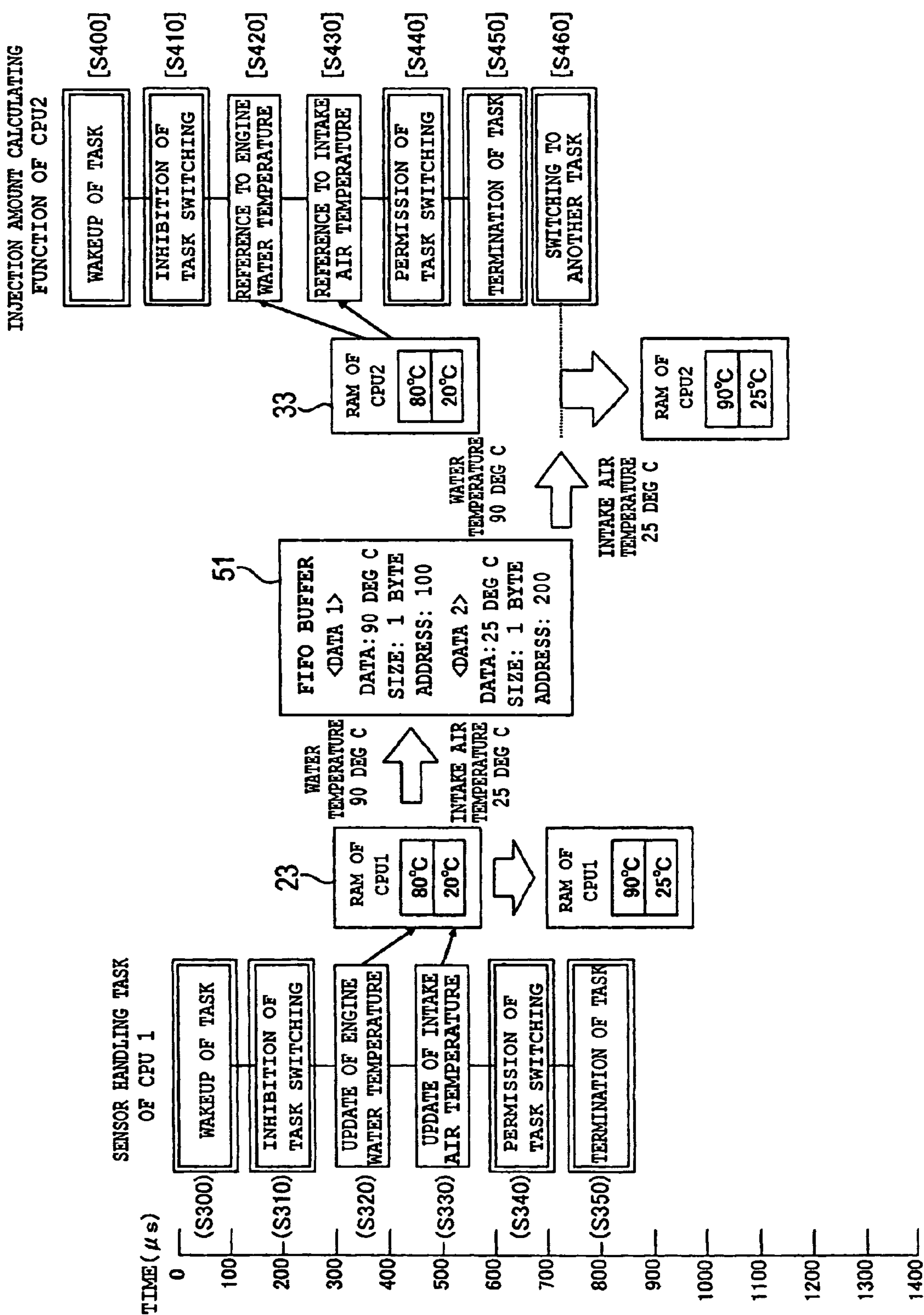
FIG. 5
TIME(μs)
0
100
200
300
400
500
600
700
800
900
1000
1100
1200
1300
1400
(S300)
(S310)
(S320)
(S330)
(S340)
(S350)
SENSOR HANDLING TASK OF CPU 1
WAKEUP OF TASK
INHIBITION OF TASK SWITCHING
UPDATE OF ENGINE WATER TEMPERATURE
UPDATE OF INTAKE AIR TEMPERATURE
PERMISSION OF TASK SWITCHING
TERMINATION OF TASK
23
RAM OF CPU1
80°C
20°C
RAM OF CPU1
90°C
25°C
WATER TEMPERATURE 90 DEG C
INTAKE AIR TEMPERATURE 25 DEG C
51
FIFO BUFFER
<DATA 1>
DATA: 90 DEG C
SIZE: 1 BYTE
ADDRESS: 100
<DATA 2>
DATA: 25 DEG C
SIZE: 1 BYTE
ADDRESS: 200
WATER TEMPERATURE 90 DEG C
INTAKE AIR TEMPERATURE 25 DEG C
33
RAM OF CPU2
80°C
20°C
RAM OF CPU2
90°C
25°C
INJECTION AMOUNT CALCULATING FUNCTION OF CPU2
WAKEUP OF TASK
[S400]
INHIBITION OF TASK SWITCHING
[S410]
REFERENCE TO ENGINE WATER TEMPERATURE
[S420]
REFERENCE TO INTAKE AIR TEMPERATURE
[S430]
PERMISSION OF TASK SWITCHING
[S440]
TERMINATION OF TASK
[S450]
SWITCHING TO ANOTHER TASK
[S460]

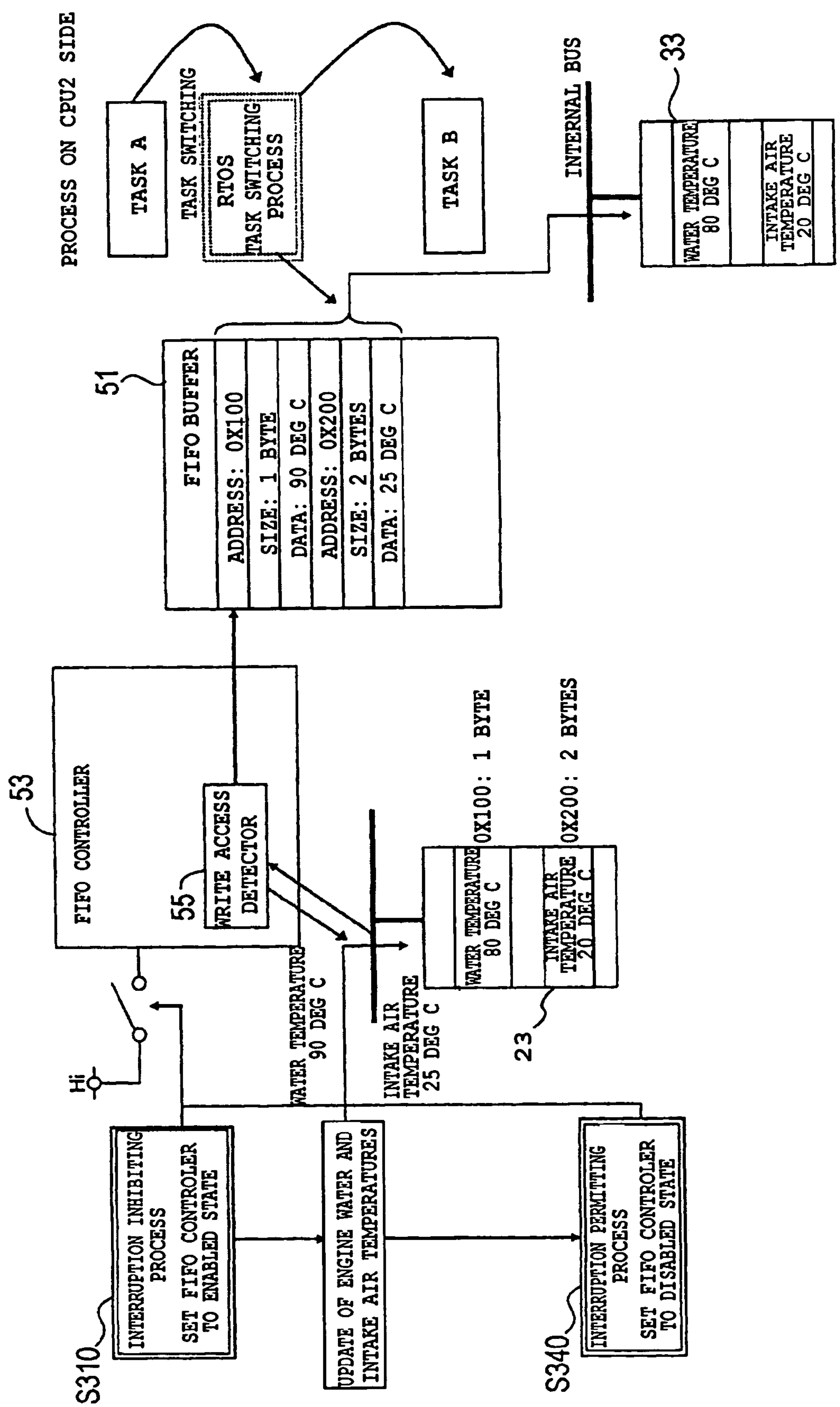
FIG. 6
S310
INTERRUPTION INHIBITING PROCESS
SET FIFO CONTROLER TO ENABLED STATE
UPDATE OF ENGINE WATER AND INTAKE AIR TEMPERATURES
S340
INTERRUPTION PERMITTING PROCESS
SET FIFO CONTROLER TO DISABLED STATE
Hi
WATER TEMPERATURE 90 DEG C
INTAKE AIR TEMPERATURE 25 DEG C
23
WATER TEMPERATURE 80 DEG C
INTAKE AIR TEMPERATURE 20 DEG C
0X100: 1 BYTE
0X200: 2 BYTES
53
FIFO CONTROLLER
55
WRITE ACCESS DETECTOR
51
FIFO BUFFER
ADDRESS: 0X100
SIZE: 1 BYTE
DATA: 90 DEG C
ADDRESS: 0X200
SIZE: 2 BYTES
DATA: 25 DEG C
PROCESS ON CPU2 SIDE
TASK A
TASK SWITCHING
RTOS
TASK SWITCHING PROCESS
TASK B
INTERNAL BUS
33
WATER TEMPERATURE 80 DEG C
INTAKE AIR TEMPERATURE 20 DEG C

INTER-CPU DATA TRANSFER DEVICE

CROSS-REFERENCE TO RELATED APPLICATION

This application is related to Japanese Patent Application No. 2005-327517 filed on Nov. 11, 2005, the contents of which are hereby incorporated by reference.

BACKGROUND OF THE INVENTION

1. Field of the Invention

The present invention relates to an inter-CPU data transfer device for a multi-CPU electronic control apparatus including a plurality of CPUs which transfer and share data thereamong.

2. Description of Related Art

It is common that a vehicle-use electronic control apparatus includes a microcomputer (referred to as CPU hereinafter) to perform various controls such as a fuel injection control of a vehicle engine, and a gear shift control of an automatic transmission. In recent years, multi-CPU electronic control apparatuses in which a plurality of CPUs cooperate to perform various control processes are being used to allow for increase of the number of control processes to be performed and increasing complexity of the control processes.

In such a multi-CPU electronic control apparatus, data has to be shared among the plurality of the CPUs. In a case where the multi-CPU electronic control apparatus includes two CPUs, as a measure to share data, it is known to provide a dual port RAM (DPRAM) which is shared by the two CPUs, as disclosed in Japanese Patent Applications laid-open No. 3-129548, and No. 5-8664. However, the provision of the DPRAM incurs increase of hardware complexity and production cost.

Another possible option for sharing data not requiring the provision of a DPRAM is adoption of a semaphore system where each of the two CPUs is configured to be able to access not only its own RAM, but also a RAM of the other CPU, and where one CPU which has failed to obtain access rights to these RAMs waits while the other CPU which has succeeded in obtaining the access rights writes data to these RAMs, and after the access rights are released, the one CPU accesses its own RAM to read data therefrom.

FIG. 7 shows an example of such a semaphore system with an arbitration mechanism adopted for a fuel injection control performed by two CPUs (CPU 1 and CPU 2). In this example, the CPU 1 performs a sensor handling function in order to convert an analog signal from a water temperature sensor detecting a cooling water temperature of a vehicle engine (may be referred to as "engine water temperature" hereinafter) into a digital signal, convert an analog signal from an intake air temperature sensor detecting an intake air temperature of the vehicle engine into a digital signal, and updates an engine water temperature data item and an intake air temperature data item by these digital signals. While, the CPU 2 performs an injection amount calculating function in order to calculate a fuel injection amount as a controlled variable referring to the cooling water temperature data item and the intake air temperature data item periodically updated by the CPU 1. For the CPU 2 to accurately calculate the fuel injection amount, all the data items (engine water temperature data item and intake air temperature data item) must be updated at the same timing. Hereinafter, a plurality of data items which are used for calculating a controlled variable, and accordingly need to be updated at the same timing are called "data items to be synchronous".

As shown in FIG. 7, the sensor handling function performed by the CPU 1 begins by inhibiting interruption (step S11). Next the CPU 1 obtains an access right to a RAM of the CPU 2, to disable the CPU 2 from accessing the RAM of the CPU 2 (step S12).

After that, an analog signal from the water temperature sensor is converted into a digital signal, and the engine water temperature data item stored in the RAM of the CPU 1 is updated by this digital signal (step S13). Likewise, an analog signal from the intake air temperature sensor is converted into a digital signal, and the intake air temperature data item stored in the RAM of the CPU 1 is updated by this digital signal (step S14).

At step S13, 14, the engine water temperature data item and the intake air temperature data item stored in the RAM of the CPU 2 are also updated by these digital signals, so that the data items stored in the RAM of the CPU 2 are identical to those stored in the RAM of the CPU 1. Here, it is assumed that the engine water temperature data item has been updated from 80 degrees C. to 90 degrees C., and the intake air temperature data item has been updated from 20 degrees C. to 25 degrees C.

Next, the sensor handling function proceeds to step S15 to release the access right to the RAM of the CPU 2, and then proceeds to step S16 to permit interruption.

On the other hand, the injection amount calculating function performed by the CPU 2 begins by inhibiting interruption (step S21). Next, the CPU 2 tries to obtain the access right to the RAM thereof. However, since this access right has been already taken by the CPU 1, the CPU 2 continues to issue requirement of the access right until the CPU 1 releases this access right (step S22).

After the CPU 1 releases the access right to the RAM of the CPU 2, and the CPU 2 obtains this access right, the injection amount calculating function proceeds to step 23 to read the engine water temperature data item from the RAM thereof, and then proceeds to step S24 to read the intake air temperature data item from the RAM thereof. Subsequently, the fuel injection amount is calculated on the basis of these data items. The injection amount calculating function is completed by permitting interruption at step S25.

The above described semaphore system with an arbitration mechanism enables an exclusive access to the data items to be synchronous, to thereby prevent the CPU 2 from reading data items some of which have not been subjected to a most recent update, and the others of which have been subjected to the most recent update, and erroneously performing calculation on the basis of the data items updated at different timings.

Incidentally, the reason for inhibiting interruption at the first step (step S11, step 21) and permitting interruption at the last step (step S16, step S25) in the sensor handling function performed by the CPU 1 and the injection amount calculating function performed by the CPU 2 is to attain high commonality of an application program between the multi-CPU electronic control apparatus as described above and a single-CPU electronic control apparatus which includes only a single CPU, but has a capability of the exclusive access control for the data items to be synchronous.

To give an example, in the case of a single-CPU electronic control apparatus, the sensor handling function and the injection amount calculating function are performed by the same one CPU. Accordingly, if, during the progress of the sensor handling function (that is, during the progress of update of the data items to be synchronous), an interruption is accepted to start a data reference process in which a plurality of data items being updated in succession by the sensor handling function are referred to for calculation purpose (for example, the above described fuel injection amount calculation), it causes that data items having been subjected to a most recent update and data items not having been subjected to the most recent update are used in the same data reference process, as a result of which calculation is erroneously performed on the basis of these data items updated at different timings. To avoid this, the sensor handling function is designed to begin by inhibiting interruption.

Likewise, if, during the progress of a data reference process such as the injection amount calculating function, an interruption is accepted to start the sensor handling function, it also causes erroneous calculation, because the timing at which data items read before this interruption have been updated is different from the timing at which data items read after completion of the sensor handling function have been updated.

As explained above, the semaphore system with an arbitration mechanism as shown in FIG. 7 enables an exclusive access control for the data items to be synchronous. However this system has a technical challenge that the advantage of high processing speed commonly expected of a multi-CPU system having a parallel operation capability is lost, because the CPU 2 has to wait until the CPU 1 releases the access right to the RAM 2 of the CPU 2 when the CPU 2 is requested to start a data reference process such as the injection amount calculating function in which data items to be synchronous are referred to. This considerably lowers processing efficiency, especially in the case of an application program for engine control, because such an application program includes a number of calculating functions requiring data items to be synchronous.

Furthermore, in the system as shown in FIG. 7, if both the CPU 1 and the CPU 2 try to obtain the access right to the same RAM at the same time, there is a possibility that there occurs a deadlock state in which both the CPU 1 and the CPU 2 wait the release of the access right. To avoid this, it becomes necessary to pay careful attention to the order in which the CPUs obtain an access right to each RAM. However, this considerably lowers a program developing efficiency. To give an example, in a case where an existing application program developed for a single-CPU electronic control apparatus is diverted for use in a multi-CPU electronic control apparatus, it must be reviewed and altered at a number of portions thereof.

SUMMARY OF THE INVENTION

The present invention provides an inter-CPU data transfer device for an electronic control apparatus including a first CPU having a first memory for storing computation results and a second CPU having a second memory for storing computation results, the first CPU periodically performing a data-updating process to update a plurality data items stored in the first memory, the second CPU performing a data-referring process in which the plurality of the data items updated by the first CPU are referred to for computation purpose, the inter-CPU data transfer device comprising:

a data transfer memory;

a first data transfer section activated in order to write the plurality of the data items written in the first memory to the data transfer memory when the first CPU starts the data updating process; and a second data transfer section writing the plurality of the data items written in the data transfer memory to the second memory when the second data transfer section detects that the second CPU is not performing the data-referring process.

According to the present invention, it becomes easy to develop an application program, because the two CPUs of a multi-CPU system as shown in FIG. 7 do not try to obtain the access right to the same RAM at the same time, and accordingly there is no possibility that both the two CPUs enter the deadlock state.

In addition, since it is not necessary to insert instructions to obtain the access right to the RAM (step S12, step S15, and step S22 in the system shown in FIG. 7) into a program of the sensor handling function and a program of the injection amount calculating function, it becomes easy to divert an existing application program developed for a single-CPU system to an application program for a multi-CPU system, and to attain high commonality of the application program between the single-CPU system and the multi-CPU system.

Other advantages and features of the invention will become apparent from the following description including the drawings and claims.

BRIEF DESCRIPTION OF THE DRAWINGS

In the accompanying drawings:

FIG. 2 is an explanatory view of data flow between two CPUs included in the ECU shown in FIG. 1;

FIG. 3 is an explanatory view of operations of an FIFO buffer and an FIFO controller constituting the inter-CPU data transfer device according to the first embodiment of the invention;

FIG. 4 is an explanatory view of operations of an FIFO buffer and an FIFO controller constituting an inter-CPU data transfer device according to a second embodiment of the invention;

FIG. 5 is an explanatory view of data flow between two CPUs included in an ECU which includes an inter-CPU data transfer device according to a third embodiment of the invention;

FIG. 6 is a diagram explaining operations of an FIFO buffer and an FIFO controller constituting the inter-CPU data transfer device according to the third embodiment of the invention.

PREFERRED EMBODIMENTS OF THE INVENTION

First Embodiment

Figure 1:
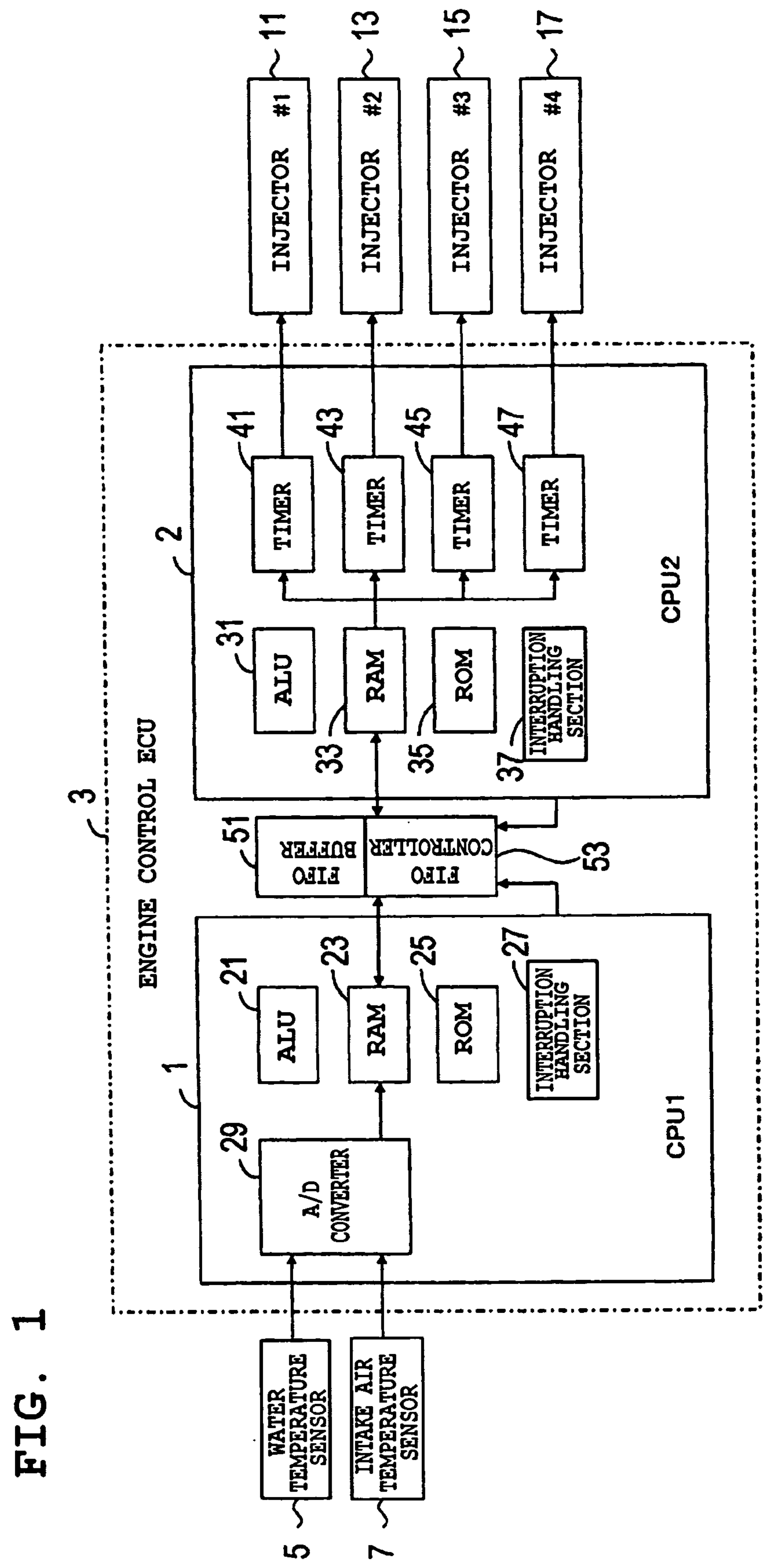
FIG. 1 is a diagram showing a configuration of an ECU (Electronic Control Unit) for controlling an internal multi-cylinder combustion engine mounted on a vehicle, which includes an inter-CPU data transfer device according to a first embodiment of the invention.

FIG. 1 is a diagram showing a configuration of an ECU 3 (Electronic Control Unit) for controlling an internal multi-cylinder (4-cylinder, for example) combustion engine mounted on a vehicle, which includes an inter-CPU data transfer device according to a first embodiment of the invention.

As shown in this figure, the ECU 3 has two CPUs, CPU1 and CPU 2. The CPU 1 is constituted by an ALU (Arithmetic Logical Unit) 21, a RAM 23 for storing arithmetic results (computation results), a ROM 25 for storing programs and static data, an interruption handling section 27, and an A/D converter 29. The CPU 2 is constituted by an ALU 31, a RAM 33 for storing arithmetic results, a ROM 35 for storing programs and static data, an interruption handling section 37, and timers 41, 43, 45, 47.

The ECU 3 further includes a buffer register 51 of the FIFO type (referred to as "FIFO buffer" hereinafter), and an FIFO controller 53 controlling read/write operation of the FIFO buffer 51. The buffer register 51 and the FIFO controller 53 constitute the inter-CPU data transfer device.

As shown in FIG. 1, a water temperature sensor 5 for detecting an engine cooling water temperature (may be referred to as "engine water temperature" hereinafter), an intake air temperature sensor 7 for detecting an engine intake air temperature, and injectors 11, 13, 15, 17 for injecting fuel into each engine cylinder are connected to the ECU 3.

Analog signals transmitted from the water temperature sensor 5 and the intake air temperature sensor 7 are converted into digital signals at regular time intervals, and stored in the RAM 23 of the CPU 1 as updated data items. These updated data items (engine water temperature data item and intake air temperature data item) stored in the RAM 23 are copied into the RAM 33 of the CPU 2.

To control the injectors 11, 13, 15, 17, the CPU 2 calculates a power supply time period corresponding to a fuel injection amount for each of these injectors on the basis of the engine water data item and the intake temperature data item that have been copied into the RAM 33 through the FIFO buffer 51, and sets a corresponding one of the timers 41, 43, 45, 47 to the calculated power supply time period. Each of the injectors 11, 13, 15, 17 is supplied with electric power to operate to inject fuel during a time period equal to the calculated power supply time period set in corresponding one of the timers 41, 43, 45, 47.

As explained above, in this embodiment, the CPU 1 stores the A/D converted digital signals only in the RAM 23 of the CPU 1 as the updated engine water temperature data item and the updated intake air temperature data item, and the CPU 2 reads these updated data items not directly from the RAM 23 but from the RAM 33 of the CPU 2 to which these updated data items have been copied through the FIFO buffer 51, so that one of the CPUs 1, 2 does not access the RAM of the other CPU.

Next, it is explained how the data transference between the CPUs 1, 2 through the FIFO buffer 51 is performed with reference to FIGS. 2 and 3, taking the case of transferring the engine water temperature data item and the intake air temperature data item from the RAM 23 to the RAM 33 as an example. FIG. 2 is an explanatory view of data flow in the CPU 1 and the CPU 2, and FIG. 3 is an explanatory view of operations of the FIFO buffer 51 and the FIFO controller 53.

As described above, the CPU 1 performs the sensor handling function as a data-updating process in which the analog signals transmitted from the water temperature sensor 5 and the intake air temperature sensor 7 are converted into digital signals, and the engine water temperature data item and the intake air temperature data item are updated by these digital signals, while the CPU 2 performs the injection amount calculating function as a data-referring process in which an fuel injection amount is calculated referring to the updated engine water temperature data item and the updated intake air temperature data item. The engine water temperature data item and the intake air temperature data item, which are referred to by the injection amount calculating function performed by the CPU 2 side, are data items to be synchronous. The sensor handling function is performed by the CPU 1 at regular time intervals, while the injection amount calculating function is performed by the CPU 2 each time an engine crank comes to a certain angle.

As shown in FIG. 2, the sensor handling function begins by inhibiting interruption by calling an interruption inhibiting function (step S110). In this embodiment, a set of instructions of each program to be executed by the CPU 1 or CPU 2 are provided in librarized form, at least for the interruption inhibiting function and an interruption permitting function. When the interrupt inhibiting function is called on the CPU 1 side, an instruction to inhibit interruption and an instruction to permit data write to the FIFO buffer 51 are executed by the CPU 1. Accordingly, when the sensor handling function starts to be performed on the CPU 1 side, data write to the FIFO buffer 51 is allowed (step S110).

Next, the sensor handling function proceeds to step S120 where an analog signal transmitted from the water temperature sensor 5 is converted into a digital signal, and the engine water temperature data item stored in the RAM 23 of the CPU 1 is updated by this digital signal. Likewise, at subsequent step S130, an analog signal transmitted from the intake air temperature sensor 7 is converted into a digital signal, and the intake air temperature data item stored in the RAM 23 of the CPU 1 is updated by this digital signal. Here, it is assumed that the engine water temperature data item is updated from 80 degrees C. to 90 degrees C., and the intake air temperature data item is updated from 20 degrees C. to 25 degrees C.

At this time, since data write to the FIFO buffer 51 is being allowed, when the data items are written to the RAM 23 of the CPU 1, the same data items are written to the FIFO buffer 51 through the FIFO controller 53. More specifically, as shown in FIG. 2, each time a data item is written to the RAM 23, this data item is also written to the FIFO buffer 51 together with its data size (the number of bytes), and an address (top address) of the RAM 23 in which this data item is stored.

When data write to the RAM 23 is completed at step S130, data write to the FIFO buffer 51 is also completed at the same time. Finally, the sensor handling function proceeds to step S140 where the interruption permitting function is called to permit interruption.

Incidentally, a set of an instruction to permit interruption and an instruction to inhibit data write to the FIFO buffer 51 are prepared in a librarized form for the interruption permitting function. Accordingly, if the interruption permitting function is called at the final stage of the sensor handling function, interruption is accepted, while data write to the FIFO buffer 51 is inhibited. The reason whythe sensor handling function inhibits interruption at its first step (step S110), and permits interruption at its last step (step S140) is the same as that described in the paragraph of Description of Related Art.

On the other hand, the injection amount calculating function performed by the CPU 2 begins by inhibiting interruption by calling an interruption inhibiting function (step S210). Next, the engine water temperature data item and the intake air temperature data item are read from the RAM 33 of the CPU 2, and a fuel injection amount is calculated by use of these read data items (step S220, step S230).

Finally, the injection amount calculating function calls an interrupt permitting function to permit interruption (step S240). On the CPU 2 side, when the injection amount calculating function calls the interruption inhibiting function at step S210, only an instruction to inhibit interruption is executed, and when the injection amount calculating function calls the interruption permitting function at step S240, only an instruction to permit interruption is executed. The reason why the injection amount calculating function inhibits interruption at its first step (step S210), and permits interruption at its last step (step S240) is the same as that described in the paragraph of Description of Related Art.

The FIFO buffer 51 is so configured that when a data item stored therein is written to the RAM 33 of the CPU 2, this data item is erased from the FIFO buffer 51. The FIFO controller 53 monitors whether or not there exists any data item in the FIFO buffer 51 and whether or not the CPU 2 is in an interruption permitting state. Only when there exists some data item in the FIFO buffer 51, and the CPU 2 is in the interruption permitting state, the FIFO controller 53 performs to copy the data item from the FIFO buffer 51 to the RAM 33 of the CPU 2.

That is because, since there is a possibility that the CPU 2 is referring to data items to be synchronous, or performing the injection amount calculating function when the CPU 2 is in the interruption inhibiting state, it is desirable not to perform the data copy from the FIFO buffer 51 to the RAM 33 of the CPU 2 when the CPU 2 is in the interruption inhibiting state.

Next, the operation of the FIFO controller 53 is explained with reference to FIG. 3. As shown in this figure, the FIFO controller 53 includes a write access detector 55 as a first data transfer section, and a write control section 57 and an AND circuit 59 as a second data transfer section.

When the instruction to permit data write to the FIFO buffer 51 (may be referred to as "data write permitting instruction" hereinafter) is executed by the CPU 1 at step S110, an active-level signal (a high-level signal in this embodiment) is applied to an enable terminal of the FIFO controller 53, as a result of which the write access detector 55 is activated. The activation of the write access detector 55 starts a function of writing data items in the RAM 23 of the CPU 1 to the FIFO buffer 51.

The write access detector 55 activated by execution of the data write permitting instruction monitors a memory access signal which the CPU 1 outputs at the time of accessing the RAM 23, and a R/W signal indicating which of read access (R) and write access (W) this access is, and judges that the CPU 1 is making a write access to the RAM 23, that is, writing data to the RAM 23 if the memory access signal is at an active level (high level in this embodiment), and the R/W signal is at a level indicative of the write access (high level in this embodiment).

When the write access detector 55 detects write access to the RAM 23, it traces an internal bus of the CPU 1 in order to write data on the internal bus to the FIFO buffer 51 together with its data size and write address. Accordingly, when a data item is written to the RAM 23 by step S120 or step S130 of the sensor handling function, it is also written to the FIFO buffer 51 together with its data size and its address in the RAM 23.

When the instruction to inhibit data write to the FIFO buffer 51 is executed by the CPU 1 at step S140, an inactive-level signal (low-level signal) is applied to the enable terminal of the FIFO controller 53, as a result of which the write access detector 55 is deactivated. The deactivation of the write access detector 55 brings the FIFO controller 53 to a data write inhibiting state in which data write to the FIFO buffer is inhibited. In this state, the function of writing data items from the RAM 23 of the CPU 1 to the FIFO buffer 51 is stopped.

The AND circuit 59 of the FIFO controller 53 is applied with a status bit of the FIFO buffer 51 and a interruption inhibition status bit of the CPU 2. The status bit of the FIFO buffer 51 is at logical 0 when there exists any data item in the FIFO buffer 51, otherwise it is at logical 0. This status bit is outputted from a monitoring circuit (not shown) monitoring data in the FIFO buffer 51. The monitoring circuit sets the status bit at logical 1 indicating that the FIFO buffer 51 is nil, that is, all the bits of the FIFO buffer are at the same logical level.

The interruption inhibition status bit of the CPU 2, which is a bit in a status register (not shown) indicative of an internal state of the CPU 2, is set at logical 0 when the CPU 2 is in the interruption permitting state, and at logical 1 when the CPU 2 is in the interruption inhibiting state. The status register is provided in the interruption control section 37 of the CPU 2.

The AND circuit 59 monitors the status bit of the FIFO buffer 51 and the interruption inhibition status bit of the CPU 2, and activates the write control section 57 when it detects that both of these status bits are logical 0, and accordingly it judges that there exists some data item in the FIFO buffer 51, and the CPU 2 is in the interruption permitting state.

The write control section 57 activated by the AND circuit 59 makes a write access to the RAM 33 of the CPU 2 in order to write data items stored in the FIFO buffer 51 to the RAM 33. To be more precise, the write control section 57 writes each data item stored in the FIFO buffer 51 to the RAM 33 at the same address as the address at which it is stored in the RAM 23, referring to its data size and its write address stored in the FIFO buffer 51. When the data items are written to the RAM 33, these data item are erased from the FIFO buffer 51, as a result of which the status bit of the FIFO buffer 51 changes from logical 0 to logical 1. After that, when any data item is written to the FIFO buffer 51, the status bit of the FIFO buffer 51 changes from logical 1 to logical 0 again.

In the ECU 3 having the above described configuration, if the injection amount calculating function is started on the CPU 2 side during the progress of the sensor handling function on the CPU 1 side, the same data items as data items being updated by this sensor handling function are written to the FIFO buffer 51 by the write access detector 55 of the FIFO controller 53, however, the write control section 57 of the FIFO controller 53 is not activated at this time, because the CPU 2 is in the interruption inhibiting state. Accordingly, since the data items stored in the RAM 33 of the CPU 2 at this time are those updated by the sensor handling function performed at the previous time (engine water temperature =80 degrees C., intake air temperature=20 degrees C.), the CPU 2 calculates a fuel injection amount on the basis of the data items updated at the previously performed sensor handling function. Thus, the injection amount calculating function is performed unremittedly.

When the CPU 2 enters the interruption permitting state (step S240) after completion of the injection amount calculating function, the write control section 57 of the FIFO controller 53 is activated to write the latest data items (engine water temperature=90 degrees C., intake air temperature=25 degrees C.) updated by the sensor handling function performed this time from the FIFO buffer 51 to the RAM 33 of the CPU 2. After that, when the injection amount calculating function is started again, the CPU 2 reads these latest data items from the RAM 33 to calculate a fuel injection amount.

In a case where the injection amount calculating function is not in progress, and accordingly the CPU 2 is in the interruption permitting state when the data items are updated and written to the FIFO buffer 51, the write control section 57 of the FIFO controller 53 is activated promptly to write the data items updated this time, that is the latest data items from the FIFO buffer 51 to the RAM 33. Thereafter, the CPU 2 reads the latest data items from the RAM 33 to calculate a fuel injection amount when the injection amount calculating function is started.

According to this embodiment, it is possible to prevent the CPU 2 from waiting idle, while ensuring synchronism of a plurality of data items updated on the CPU 1 side and referred to on the CPU 2 side for calculation purpose. More specifically, this embodiment makes it possible to perform the injection amount calculating function on the CPU 2 side even during a period when the sensor handling function is performed on the CPU 1 side to update the data items to be synchronous (engine water temperature data item and the intake air temperature data item). This greatly improves the processing efficiency.

Figure 7:
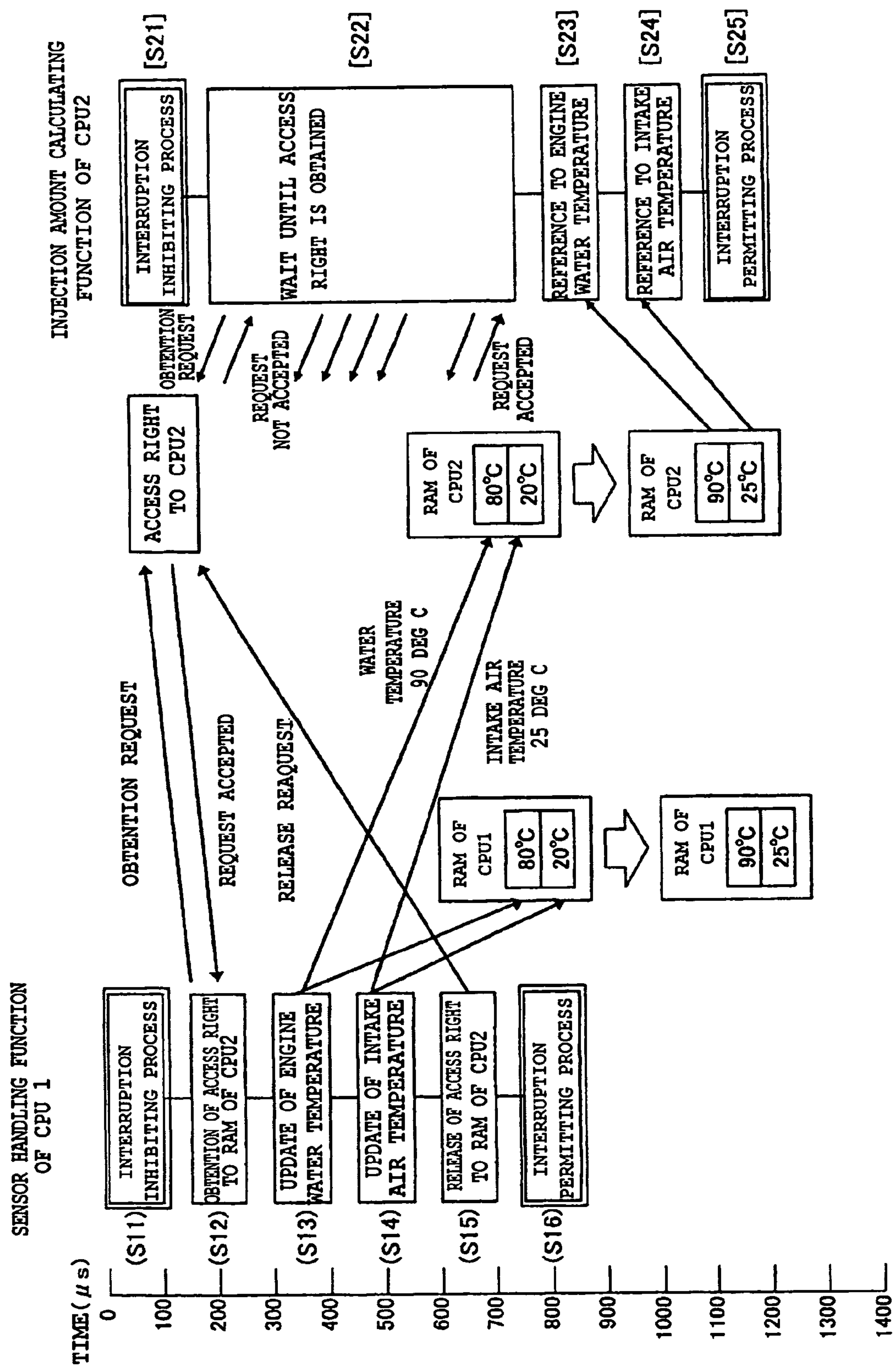
FIG. 7 is a diagram for explaining an operation of a conventional electronic control apparatus including two CPUs used for controlling fuel injection to a vehicle engine.

Incidentally, in the conventional system shown in FIG. 7, the engine water temperature data item and the intake air temperature data item updated on the CPU 1 side are written to the RAM of the CPU 2 after a lapse of about 300 μs and after a lapse of about 450 μs, respectively, since the start of the sensor handling function. On the other hand, in the system shown in FIG. 2, they are written to the RAM 33 of the CPU 2 after a lapse of about 600 μs since the start of the sensor handling function. It may appear that the system shown in FIG. 2 requires a longer time to update the data items in the RAM 33 than the system shown in FIG. 7. However, it should be noted that, in the system shown in FIG. 7, the time needed for the latest data items to become a state where they can be referred to on the CPU 2 side from the start of the sensor handling function on the CPU 1 side is about 800 μs, while it is 650 μs in the system shown in FIG. 2. As understood from this, eliminating waiting time necessary to arbitrate the access right rather makes it possible to update and use the data items at a high rate.

In addition, with this embodiment, it becomes easy to develop an application program, because the two CPUs, the CPU 1 and CPU 2 do not try to obtain the access right to the same RAM at the same time, and accordingly there is no possibility that both the CPU 1 and the CPU 2 enter the deadlock state.

To give an example, since it is not necessary to insert instructions to obtain the access right to the RAM (step S12, step S15, and step S22 in the system shown in FIG. 7) into a program of the sensor handling function and a program of the injection amount calculating function, it becomes easy to divert an existing application program developed for a single-CPU system to an application program for a multi-CPU system, and to attain high commonality of the application program between the single-CPU system and the multi-CPU system.

More specifically, since the ECU 3 of this embodiment is so configured that the write control section 57 of the FIFO controller 53 monitors whether or not the CPU 2 is in the interruption permitting state, and performs data write from the FIFO buffer 51 to the RAM 33, when it detects that the CPU 2 is in the interruption permitting state, and accordingly it judges that the injection amount calculating function is not being performed on the CPU 2 side, it becomes possible to use a program of the injection amount calculating function developed for the single CPU-system as that for the multi-CPU system.

In addition, this embodiment is provided with a function library to enable the CPU 1 to execute the instruction to inhibit interruption and instruction to permit data write to the FIFO buffer 51 (or the instruction to activate the write access detector 55) when the interruption inhibiting function is called, and to execute the instruction to permit interruption and instruction to inhibit data write to the FIFO buffer 51 (the instruction deactivating the write access detector 55) when the interruption permitting function is called. And the write access detector 55 is configured to be activated when the interruption inhibiting function is called at the time of starting the sensor handling function on the CPU 1 side (step S110), and to be deactivated when the interruption permitting function is called at the time of terminating the sensor handling function (step S140).

This makes it possible to use as it is a program of the sensor handling function developed for the single-CPU system as a program of the sensor processing function for the multi-CPU system, because since a part to call the interruption inhibiting function at the beginning, and a part to call the interruption permitting function at the last of the sensor handling function program do not differ between the multi-CPU system and the single-CPU system, it is possible to support the multi-CPU system only by altering the function library without making modification to the application program developed for the single-CPU system.

Incidentally, instead of altering the function library, the application program may be modified to support the multi-CPU system. For example, an instruction to activate the write access detector 55 may be inserted between step S110 and step S120 in FIG. 2, and an instruction to deactivate the write access detector 55 may be inserted between step S130 and step S140 in FIG. 2. Also in this case, since there is no fear that both the CPU1 and the CPU 2 become deadlock at the same, the sensor handling function for the multi-CPU system can be easily programmed by making slight modifications to the program developed for the single-CPU system.

Furthermore, since the write control section 57 and the AND circuit 59 of the FIFO controller 53 are configured not to perform data write from the FIFO buffer 51 to the RAM 33 if there exists no data item in the FIFO buffer 51, the data write frequency can be minimized.

Second Embodiment

Next, a second embodiment of the invention is explained.

FIG. 4 is an explanatory view of operations of the FIFO buffer 51 and the FIFO controller 53 constituting an inter-CPU data transfer device according to the second embodiment of the invention. The second embodiment differs from the first embodiment in that the write control section 57 and the AND circuit 59 are removed from the FIFO controller 53, and that the data write (data copy) operation from the FIFO buffer 51 to the RAM 33 of the CPU 2 is performed by an interrupt routine on the CPU 2 side.

In more detail, the CPU 1 is configured to issue an interrupt request (IRQ) to the CPU 2 at the final stage (step S140) of the sensor handling function. To this end, in this embodiment, a set of instructions including an instruction to issue the interrupt request to the CPU 2 in addition to the instruction to permit interruption and the instruction to inhibit data write (the instruction to deactivate the write access detector 55) are prepared in librarized form as for the interrupt permitting function. Accordingly, if the interrupt permitting function is called at the final stage of the sensor handling function, interruption is permitted, data write to the FIFO buffer 51 is inhibited, and the interrupt request is issued from the CPU 1 to the CPU 2.

When the interrupt request issued from the CPU 1 is received by the CPU 2, an interrupt routine (may be referred to as "data copy routine" hereinafter) is activated to perform data write from the FIFO buffer 51 to the RAM 33.

As explained above, in the second embodiment, each time the sensor handling function is performed on the CPU 1 side, the interrupt request is issued from the CPU 1 to the CPU 2 at the final stage of the sensor handling function. In a case where the interrupt request is issued during the time when the CPU 2 is performing the injection amount calculating function, and accordingly the CPU 2 is in the interrupt inhibiting state, the data copy routine is activated to perform data write from the FIFO buffer 51 to the RAM 33 when the CPU 2 enters the interrupt permitting state after completion of the injection amount calculating function. On the other hand, in a case where the interrupt request is issued when the CPU 2 is not performing the injection amount calculating function, and accordingly the CPU 2 is in the interruption permitting state, the data copy routine is promptly activated to perform data write from the FIFO buffer 51 to the RAM 33 when this interrupt request is issued.

According to the second embodiment, it becomes possible to eliminate the write control section 57 and the AND circuit 59 from the FIFO controller 53, while offering the same advantages as those offered by the first embodiment by modifying the sensor handling function performed on the CPU 1 side such that it issues the interrupt request, and by providing the data copy routine activated on the CPU 2 side in response to this interrupt request.

Third Embodiment

Both the first embodiment and the second embodiment have such a configuration that whether or not data write from the FIFO buffer 51 to the RAM 33 should be performed is determined depending on in which of the interruption permitting state and the interruption inhibiting state the CPU 2 is, in order to enable data write on the side of the CPU 2 which needs to refer to the data items stored in the FIFO buffer 51 even if the CPU 2 is not provided with any OS. However, when at least the CPU 2 which needs to refer to the data items stored in the FIFO buffer 51 is provided with some OS, the function needed to write data items stored in the FIFO buffer 51 to the RAM 33 can be assumed by the OS.

FIG. 5 is an explanatory view of data flow in the CPU 1 and the CPU 2 of an ECU which includes an inter-CPU data transfer device according to a third embodiment of the invention. FIG. 6 is a diagram explaining operations of the FIFO buffer 51 and the FIFO controller 53 constituting the inter-CPU data transfer device according to the third embodiment of the invention. The third embodiment differs from the first embodiment in the followings (1) to (5).

(1) An RTOS (Real Time Operating System) capable of parallel-executing a plurality of different tasks is mounted on each of the CPU 1 and the CPU 2. Accordingly, in each of the CPU 1 and the CPU 2, each task runs on the RTOS.

(2) As shown in FIG. 6, the write control section 57 and the AND circuit 59 are removed from the FIFO controller 53 as is the case with the second embodiment.

(3) As shown in FIG. 5, a sensor handling task equivalent to the sensor handling function shown in FIG. 2 is performed on the CPU 1 side. Incidentally, each of the boxes surrounded by a double line in FIG. 5 indicates a processing performed by a system call (function) of the RTOS which is called by the application program.

The sensor handling task performed on the CPU 1 side begins by calling a system call to wake itself up at step S300. Next, the sensor handling task calls a system call to inhibit task switching at step S310.

In the third embodiment, if the system call to inhibit task switching is called, the RTOS performs a task-switching inhibiting process, and a process of permitting data write to the FIFO buffer 51, as a result of which the enable terminal of the FIFO controller 53 is applied with an active-level signal to activate the write access detector 55 (see FIG. 6) as is the case with the first embodiment.

Next, the sensor handling task proceeds to step S320 to convert an analog signal from the water temperature sensor into a digital signal by which the engine water data item stored in the RAM 23 is updated, and then proceeds to step S330 to convert an analog signal from the intake air temperature sensor into a digital signal by which the intake air temperature data item stored in the RAM 23 is updated.

At this time, since data write to the FIFO buffer 51 has been permitted, that is, the write access detector 55 has been activated, if any data item is written in the RAM 23 of the CPU 1, the same data item as this data item is written to the FIFO buffer 51 by the write access detector 55. When the data write to the RAM 23 is completed, the data write to the FIFO buffer 51 is completed at the same time.

Next, at step S340, a system call to permit task switching is called to permit task switching. In the third embodiment, if the system call to permit task switching is called, the RTOS performs an operation to permit task switching, and an operation to inhibit data write to the FIFO buffer 51, as a result of which the enable terminal of the FIFO controller 53 is applied with a nonactive-level signal to deactivate the write access detector 55 (see FIG. 6) as is the case with the first embodiment.

Finally, a system call to terminate the sensor handling task is called at step S350. As explained above, the write access detector 55 is activated by calling the system call to inhibit task-switching at the time of starting the sensor handling task on the CPU 1 side, and is deactivated by calling the system call to permit task-switching at the time of terminating the sensor handling task.

Incidentally, inhibiting task-switching in a CPU provided with an OS is equivalent to inhibiting interruption in a CPU not provided with an OS, and permitting task-switching in a CPU provided with an OS is equivalent to permitting interruption in a CPU not provided with an OS.

(4) As shown in FIG. 5, an injection amount calculating task equivalent to the injection amount calculating function shown in FIG. 2 is performed on the CPU 2 side.

This injection amount calculating task begins by calling a system call to wake itself up at step S400. Next, the injection amount calculating task calls a system call to inhibit task-switching call at step S410. As a result, the RTOS performs a process to inhibit task-switching.

Subsequently, the engine water temperature data item and the intake air temperature data item are read from the RAM 33 at steps S420 and step S430, respectively, to calculate a fuel injection amount based on these data items.

After that, a system call to permit task-switching is called at step S440. In consequence, the RTOS performs a process to permit task-switching. Finally, a system call to terminate the injection amount calculating function is called at step S450, as a result of which the RTOS performs a process to switch to another task at step S460.

(5) As shown in the right side of FIG. 6, it is judged on the CPU 2 side whether or not there exists any data item in the FIFO buffer 51 while the RTOS is performing the task-switching process to change tasks. If it is judged that there exists some data item, that is, if the FIFO buffer 51 is not empty, data write from the FIFO buffer 51 to the RAM 33 is performed. This data write process in this embodiment is equivalent to the function provided by the write control section 57 of the first embodiment.

In the third embodiment, even when the sensor handling task has been performed on the CPU 1 side, and accordingly data items stored in the RAM 23 and the FIFO buffer 51 have been updated, if the injection amount calculating task is in progress, data write from the FIFO buffer 51 to the RAM 33 of the CPU 2 is not performed. This data write is performed when the CPU 2 is switched to another task after the injection amount calculating task is completed. These updated data items are used when the injection amount calculating task is performed next time.

In the third embodiment, the RTOS on the CPU 1 side undertakes the function of activating the write access detector 55 of the FIFO controller 53, and the RTOS on the CPU 2 side undertakes the function of writing data from the FIFO buffer 51 to the RAM 33. Accordingly in the third embodiment, these functions are hidden to the application program.

This makes it possible for both the multi-CPU system and the single-CPU system to use the same task programs (application program).

It is a matter of course that various modifications can be made to the above described embodiments.

For example, in a case where data items are periodically updated on the CPU 2 side, and the CPU 1 refers to these data items, the configuration for data transfer including the FIFO buffer and the FIFO controller as described in the first to third embodiments can be used for transferring data items from the CPU 2 to the CPU 1.

It should be noted that the present invention is applicable to any electronic control apparatus having a plurality of CPUs between which data has to be transferred, other than an engine ECU for controlling a vehicle engine.

The above explained preferred embodiments are exemplary of the invention of the present application which is described solely by the claims appended below. It should be understood that modifications of the preferred embodiments may be made as would occur to one of skill in the art.

What is claimed is:

1. An inter-CPU data transfer device for an electronic control apparatus including a first CPU having a first memory for storing computation results and a second CPU having a second memory for storing computation results, said first CPU periodically performing a data-updating process to update a plurality data items stored in said first memory, said second CPU performing a data-referring process in which said plurality of said data items updated by said first CPU are referred to for computation purpose, said inter-CPU data transfer device comprising:

a data transfer memory;

a first data transfer section activated in order to write said plurality of said data items written in said first memory to said data transfer memory when said first CPU starts said data updating process; and a second data transfer section writing said plurality of said data items written in said data transfer memory to said second memory when said second data transfer section detects that said second CPU is not performing said data-referring process;

wherein said second CPU inhibits interruption when said data-referring process is started and permits interruption when said data-referring process is completed, and said second data transfer section monitors whether or not said second CPU is in an interruption permitting state and judges that said second CPU is not performing said data-referring function when said second CPU is in said interruption permitting sate.

2. The inter-CPU data transfer device according to claim 1, wherein said first CPU issues an interruption request to said second CPU at the time of terminating said data-updating process, said second CPU performs data write from said data transfer memory to said second memory by activating an interruption routine serving as said second data transfer section in response to said interruption request.

3. An inter-CPU data transfer device for an electronic control apparatus including a first CPU having a first memory for storing computation results and a second CPU having a second memory for storing computation results, said first CPU periodically performing a data-updating process to update a plurality data items stored in said first memory, said second CPU performing a data-referring process in which said plurality of said data items updated by said first CPU are referred to for computation purpose, said inter-CPU data transfer device comprising:

a data transfer memory;

a first data transfer section activated in order to write said plurality of said data items written in said first memory to said data transfer memory when said first CPU starts said data updating process; and a second data transfer section writing said plurality of said data items written in said data transfer memory to said second memory when said second data transfer section detects that said second CPU is not performing said data-referring process;

wherein said data transfer memory is configured to erase said plurality of said data items stored therein when said plurality of said data items are written therefrom to said second memory, said second data transfer section writing said plurality of said data items from said data transfer memory to said second memory upon detecting that said second CPU is not performing said data-referring process.

4. An inter-CPU data transfer device for an electronic control apparatus including a first CPU having a first memory for storing computation results and a second CPU having a second memory for storing computation results, said first CPU periodically performing a data-updating process to update a plurality data items stored in said first memory, said second CPU performing a data-referring process in which said plurality of said data items updated by said first CPU are referred to for computation purpose, said inter-CPU data transfer device comprising:

a data transfer memory;

a first data transfer section activated in order to write said plurality of said data items written in said first memory to said data transfer memory when said first CPU starts said data updating process; and a second data transfer section writing said plurality of said data items written in said data transfer memory to said second memory when said second data transfer section detects that said second CPU is not performing said data-referring process;

wherein said first data transfer section is activated when said first CPU executes a specific instruction at the time of starting said data-updating process, and said first CPU inhibits interruption at the time of starting said data-updating process, and permits interruption at the time of terminating said data-updating process, said first CPU performing a process to inhibit interruption and a process to activate said first data transfer section when a function to inhibit interruption is called at the time of starting said data-updating process.

5. An inter-CPU data transfer device for an electronic control apparatus including a first CPU having a first memory for storing computation results and a second CPU having a second memory for storing computation results, said first CPU periodically performing a data-updating process to update a plurality data items stored in said first memory, said second CPU performing a data-referring process in which said plurality of said data items updated by said first CPU are referred to for computation purpose, said inter-CPU data transfer device comprising:

a data transfer memory;

a first data transfer section activated in order to write said plurality of said data items written in said first memory to said data transfer memory when said first CPU starts said data updating process; and a second data transfer section writing said plurality of said data items written in said data transfer memory to said second memory when said second data transfer section detects that said second CPU is not performing said data-referring process;

wherein said second CPU is provided with an OS to perform tasks on said OS, said OS performing a write process serving as said second data transfer section in order to write said plurality of said data items from said data transfer memory to said second memory when said OS switches tasks, and said data transfer memory is configured to erase said plurality of said data items stored therein when said plurality of said data items are written therefrom to said second memory, said OS performing said write process if said data transfer memory is not empty when said OS switches tasks.

6. An inter-CPU data transfer device for an electronic control apparatus including a first CPU having a first memory for storing computation results and a second CPU having a second memory for storing computation results, said first CPU periodically performing a data-updating process to update a plurality data items stored in said first memory, said second CPU performing a data-referring process in which said plurality of said data items updated by said first CPU are referred to for computation purpose, said inter-CPU data transfer device comprising:

a data transfer memory;

a first data transfer section activated in order to write said plurality of said data items written in said first memory to said data transfer memory when said first CPU starts said data updating process; and a second data transfer section writing said plurality of said data items written in said data transfer memory to said second memory when said second data transfer section detects that said second CPU is not performing said data-referring process;

wherein said second CPU is provided with an OS to perform tasks on said OS, said OS performing a write process serving as said second data transfer section in order to write said plurality of said data items from said data transfer memory to said second memory when said OS switches tasks, and said first CPU is provided with said OS, and wherein when a data-updating task to update said plurality of said data items is started to be performed on said OS, a function to inhibit task switching is called to cause said OS to inhibit task switching and to activate said first data transfer section, and, when said data-updating task is terminated, a function to permit task-switching is called to cause said OS to permit task switching.

* * * * *